Patented June 23, 1953

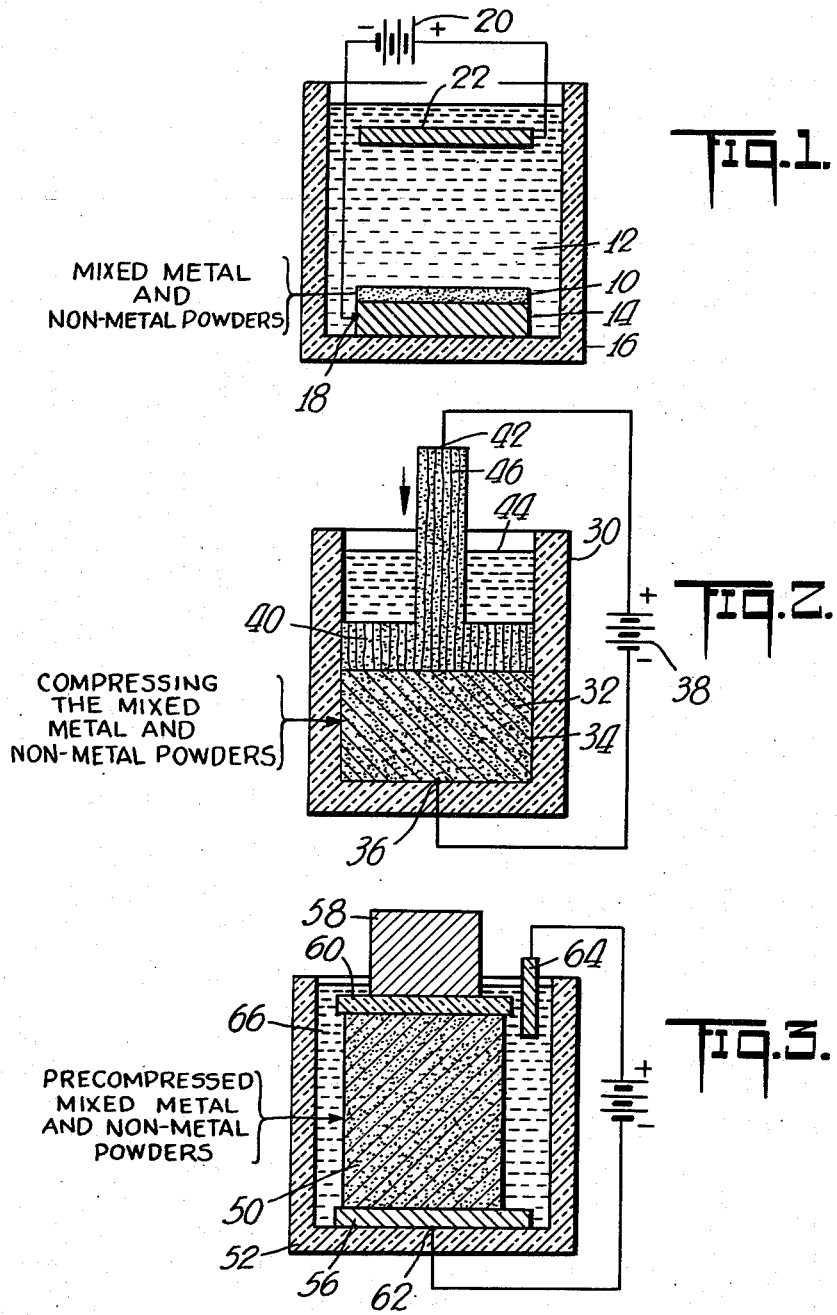

2,642,654

UNITED STATES PATENT OFFICE 2,642,654

ELECTRODEPOSITED COMPOSITE ARTICLE AND METHOD OF MAKING THE SAME

Gerhard W. Ahrens, New York, N. Y., assignor to Econometal Corporation, a corporation of Delaware Application December 27, 1946, Serial No. 718,901

5 Claims. (Cl. 29—192)

My invention relates to the art of powder metallurgy and more particularly to the formation of rigid articles of any size and shape from particles including divided material, such as diamonds.

Hitherto such articles were made by a process employing molten metal for uniting the particles; or by continuously electroplating for many hours on a metal plate until a layer of divided material supported on the plate was slowly embedded in a mass of electroplated metal; or by employing pressures and temperatures of sufficient magnitude to weld the mass into desired size and shape.

The principal object of my invention comprises a method of producing rigid articles of selected size and shape containing selected divided material without employing high pressures and temperatures.

Other objects are to provide suitable supporting particles for building up the divided material into a mass of uniformly distributed particles and to provide a method of uniting the particles into a rigid mass of the desired size and shape in a relatively short period of time.

I accomplish these and other objects and obtain my new results as will be apparent from the article and process described in the following specification, particularly pointed out in the claims, and illustrated in the accompanying drawing in which:

Figure 1 illustrates diagrammatically the electroplating of a bulk containing a loose uniform mixture of divided material and powdered metallic particles into a rigid article.

Figure 2 illustrates diagrammatically the use of a carbon anode for pressing and plating the bulk material.

Figure 3 illustrates diagrammatically the electroplating of a pre-compressed bulk of the material.

In my invention I employ certain divided materials which it is desired to form into the desired size and shape and mix these with selected metallic powders until a substantially uniform mixture is obtained, and thereafter I bulk plate the shaped mass forming an integrated bond of the plating metal with the metallic powders thereby uniting all the particles into a rigid structure.

Shaped articles that may be made by my process include tools, dies, instruments, implements, grinding and abrasion tools, wheels or discs, drills, cutters, bearings, frictional surfaces for brakes, clutches, shanks, machine parts, bushings, rings, linings, gages, electrodes, corrosion- and heat-resistant parts, hard parts such as armor plate, guides and tubings, shells, etc.

The entire articles may be made by my process, or the process employed to form deposits, coatings, claddings, linings, layers, or bonds.

Some examples of the divided material which may be used in my process are beryllium, silicon, titanium, vanadium, chromium, zirconium, columbium, molybdenum, ruthenium, rhodium, hafnium, tungsten, rhenium, osmium, thorium, uranium, boron, palladium, tantalum, iridium, platinum, carbon; compounds such as the nitrides of silicon, titanium, vanadium, chromium, manganese, iron, cobalt, nickel, zirconium, columbium, molybdenum, tungsten, boron, tantalum; the carbides of beryllium, silicon, titanium, vanadium, chromium, manganese, iron, cobalt, nickel, zirconium, columbium, molybdenum, tungsten, thorium, uranium, tantalum; the borides of titanium, vanadium, chromium, manganese, iron, cobalt, nickel, zirconium, columbium, molybdenum, tungsten, thorium, uranium, tantalum; the oxides of beryllium, silicon, zirconium, cerium, thorium, aluminum, magnesium; the sulfides such as tungsten sulfide; the hydrides of titanium, vanadium, chromium, iron, cobalt, nickel, zirconium, columbium, molybdenum, tungsten, tantalum; the silicides of titanium, vanadium, chromium, manganese, iron, cobalt, nickel, zirconium, columbium, molybdenum, tungsten, thorium, tantalum; and non-metallic materials such as diamonds, sapphires, bauxite, ruby, Carborundum and beryl.

It shall be understood that the divided material which is one of the primary ingredients of the articles of this invention may also represent a suitable mixture of different divided materials; or one or more of the divided materials may be in the form of alloys; the foregoing divided materials are characterized by me as materials having a relatively high fusion point, tensile strength and hardness.

Some examples of the metallic powder particles which may be used in my process are titanium, vanadium, chromium, manganese, iron, cobalt, nickel, columbium, molybdenum, rhodium, tungsten, palladium, silver, antimony, neodymium, tantalum, platinum, gold, copper, germanium, lanthanum, yttrium; mixtures thereof; and alloys such as of beryllium, vanadium, chromium, manganese, iron, cobalt, nickel, molybdenum, tungsten, silver, platinum, gold, copper, germanium, lanthanum. These are generally characterized by me as having a relatively high melting point and tensile strength. It shall be understood that coated metal powder particles whose coating consists of a different type of metal than the metal powder particle, such as silver-coated steel, copper-coated steel, chromium-coated steel, nickel-coated iron, cobalt-coated tungsten and the like, are included among the useful metallic powders for use in my process.

Some examples of the electrolytic metal which may be used in my process as a deposit are chromium, manganese, iron, cobalt, nickel, molybdenum, rhodium, tungsten, silver, antimony, platinum, gold, copper, germanium; and alloys of beryllium, chromium, manganese, iron, cobalt, nickel, zirconium, molybdenum, rhodium, cerium, tungsten, palladium, silver, antimony, tantalum, iridium, platinum, gold, copper, germanium, lanthanum, all of which are generally characterized by me as having a relatively high melting point and tensile strength, and may be obtained from the corresponding metal compounds and mixtures thereof, and they may also be obtained from soluble metallic anodes such as manganese, iron, cobalt, nickel, silver, gold, copper.

In forming an integrated bond with the metallic powder particles any known method of plating metal from a solution may be used, the metallic powders and the divided material forming the bulk of the body, upon which the deposited metal binds the particles by internal bulk plating. The articles so formed are primarily powder metallurgical compacts which may be of any size and shape in which the particles are internally bonded among themselves by the plating action, and which article may be so plated to a support. All the plating action takes place in a liquid medium without the use of high temperatures.

One of the methods employed is the electroplating bath, as is well-known in the art, and the metals to be deposited shall be from solutions of their respective compounds such as their salts, oxides, sulfates, phosphates, whichever may be preferred for an appropriate plating solution. It is also understood that the electrolytic metal may be derived from its dissolution as metallic anode under conditions of suitable electroplating procedures in suitable electro-conductive solutions, or it may be derived from the decomposition of powdered metal-compound particles which may have been co-admixed into the bulk of divided material and metallic powder particles from which the porous and rigid article of this invention is to be manufactured. The appropriate metallic cations from the plating metal compound in the interstices deposit on and between the metallic powder particles of said bulk mixture and unite the metallic powder particles which are in electrically conducting contact with one another into an integrated and bonded porous structure containing the divided material.

*Example 1.—Bulk electroplating of loose particles uniformly distributed*

If it is desired to form an article containing a predetermined mixture of tungsten carbide particles as the divided material, and metallic cobalt as the powdered metal particles, the said particles are uniformly mixed in the desired proportions and the loose bulk mixture 10, as shown in Fig. 1, is then added to a standard electroplating solution 12 over the steel part 14 confined in an electroplating tank 16 of a kind generally employed in the art of electroplating. For the purpose of this invention the tank may contain as a standard electroplating solution one employing as the metallic compounds, the salts cobalt chloride and nickel sulfate as principal plating metal cation source, to form under suitable electroplating conditions an alloy of nickel and cobalt representing the electrolytic metal bond in the final article.

The steel part 14 is connected to the cathodic end 18 of the plating current source 20 which is also connected to a carbon anode 22 placed into the electroplating tank, spaced opposite the cathode a suitable distance to permit proper electroplating. The passage of the proper plating current densities such as usually employed with the particular electrolyte used herein, and establishing proper temperatures as are known to be suitable for the type of electroplating desired and known in the art of plating steel parts, will cause the cobalt metal powder particles to be united to one another and to the cathodic steel part by an integrated bond of an electrolytically deposited nickel-cobalt alloy which forms rapidly. The final article will contain the tungsten carbide and metallic cobalt particles all united together by an electrolytic nickel-cobalt alloy deposited throughout the interstices of the mixture to form a porous rigid mass in the size and shape the originally loose particles were supported in the electroplating tank. The electrolysis may be continued until the cations are exhausted, or until the plating is choked off in the interstices, which are continuously reduced in cross-section by the deposited metal.

*Example 2.—Internal electroplating of compressed bulk*

If it is desired to obtain an article by internal electroplating of a compressed bulk mixture, for example, in the manufacture of such a powder metallurgical article, a mold 30 may be used, as illustrated in Figure 2 of the drawing, and which is impermeable to the electrolytic solution used therein. As the first step, the desired bulk mixture of divided material and metal powder particles is thoroughly mixed until the desired substantially uniform mixture thereof is obtained. The divided material selected is chosen from the group above specified and the powder metallic particles selected are chosen from the corresponding group. This mixture 32 is introduced into the mold 30 and wetted with a suitable electroplating electrolyte 34 containing in solution a suitable plating metal or metals in the form of their respective salts, oxides, sulfates or phosphates whichever being more suitable for the particular combination chosen with reference to the desired electrolytic metal or alloy that it is desired to plate out from the said electroplating electrolyte and upon the metal powder particles used in the bulk mixture 32.

The bottom part of the mold 30 is now connected to the cathodic end 36 of the plating current source 38. A porous carbon block 40, fitted to the mold 30, is connected to the anodic end 42 of the plating current source 38. The mold 30 and its porous black carbon block 40 are placed under a pressure element 46 which will maintain a constant pressure upon the bulk mixture 32 in said mold 30. The plating current is now turned on and the bulk material 32 is internally electroplated under pressure which tends to reduce the size of the interstices of the bulk mixture during electroplating, the surplus liquid electrolyte 44 being forced out through the porous structure of the anodic carbon block 40. After completion of the electroplating operation, the pressure is released and the mold is opened to remove the internally electroplated bulk material of the invention.

*Example 3.—Internal electroplating of pre-compressed bulk*

If it is desired to obtain an article by internal electroplating of a pre-compressed powder metallurgical compact, this process may be carried out, for example, in a manner described and illustrated in Figure 3 of the drawing, which involved the steps of placing a pre-compressed powder metallurgical bulk 50 of selected size and shape, such as may be obtained by compacting, pressing or sintering operations, into an electroplating tank 52 in a desired position, for instance, such as indicated in the drawing, resting upon a metal support 56, to which it may be desired to secure the said bulk 50. A pressure device or weight 58 is applied against the bulk 50 to hold it upon the metal support 56, said pressure device being separated from the bulk 50 by a non-conducting plate 60. The cathodic end 62 of the plating current source is connected to the metal support 56 and a suitable anodic connection is made through the electroplating solution 66 containing the desired plating metal in solution to an anode 64 placed into the electroplating solution. The pre-compressed powder metallurgical bulk 50 comprises divided material and metal powder particles in substantially uniform admixture and chosen from one or more of the ingredients as outlined in the preamble of this specification, and the plating metal, too, may comprise one or more of the ingredients as outlined in the preamble of this specification. After selecting the conditions for the most suitable electroplating procedure with respect to the materials employed in the bulk 50 and the desired metal deposit, such as the temperatures, current densities and anode distance and size, the current is started and turned off after completion of the desired internal electroplating in the bulk 50, followed by the removal of said article 50 together with the metal support 56 from the electroplating tank.

It is understood that the final article may hereafter be subjected to after treatments, if desired, such as by pressure to reduce the size of the interstices, or by heating in a controlled atmospheric oven or in a reducing atmosphere or the like, to drive off whatever electrolyte remains. It is also understood that the internal electroplating procedure may be applied to a powder metallurgical article without limiting the process to the bonding thereof to a metal support such as described in this example.

If it is desired to obtain a bonded diamond article by internal electroplating, either of the described examples and illustrations may be employed and the divided material, in this case, consists of diamond particles of a selected size which are uniformly mixed with a suitable metal powder, such as cobalt or nickel, and internally plated in a plating solution comprising a suitable mixture of copper sulfate, nickel sulfate and cobalt chloride to enable the formation of an alloy under suitable electroplating conditions such as known in the art. The final article may be subjected to suitable after treatments such as heating in a controlled atmosphere to improve the physical characteristics thereof, such treatment may be one that is generally known in the art. The diamond article may not be limited to a diamond hone, it may be a diamond wheel for abrasion purposes, or a diamond cutting tool and the like. It is of particular advantage for diamond articles that the final structure possesses interstices extending throughout its porous rigid structure, which is also advantageous in articles like bearings and the like. The supports upon which a powder metallurgical compact may be bonded is not limited to steel, but may be any material capable of accepting an electroplate, such as other metal parts and plastics rendered conductive.

The bulk mixture may contain a metal compound of the desired plating metal, which under conditions of electroplating in a suitable electroplating bath decomposes into metal cations for the formation of the electrolytic metal bond and into anions which are withdrawn to the anode. The internal bond in such an article is extremely strong.

Examples of certain combinations that may be employed are tungsten carbide with deposited cobalt and nickel; a tungsten alloy by use of tungsten powder with nickel or cobalt as a binder and as metal constituent; boron carbide with a binding metal; 6% cobalt with pure tungsten carbide powder; metals such as stainless steel alloys, chromium and other metals difficult to melt; armor plate of tungsten carbide bonded with nickel or nickel-iron and as a coating to base steel; diamond powder with nickel sulfate, cobalt chloride, or copper sulfate as an electrolyte; tungsten carbide powder or boron carbide powder; tungsten carbide powder with nickel sulfate and cobalt chloride; the parts may be bonded using a foil of stainless steel and applying pressure.

Examples of the final articles are tungsten carbide parts; diamond hones or wheels; abrasive wheels and discs; diamond coatings on thin steel discs; boron carbide discs, parts, and tools; contact points; spark plug electrodes; jewelry; etc.

From the foregoing it is apparent that I have found a fast, economical process for manufacturing articles of particles difficult to plate by mixing them with readily platable metallurgical powders, forming the mixed particles into any size or shape, and internally bulk plating the entire mass into a rigid article almost instantly. The process may continue until the interstitial passages are lined with a thick layer of deposited metal. The electrolytic metal deposited on the metal powders will unite all the particles in an integrated bond.

The article may thereafter be compressed to reduce the porosity and heat treated to drive off the electrolyte.

The examples shall not be construed to impart limitation to this invention. Changes can be made with regard to electrolyte and arrangements of procedure without departing from the scope of this invention.

What I claim is:

1. In the art of powder metallurgy, the process of manufacturing articles of selected size and shape containing divided material of high fusion point, tensile strength and hardness, by internal bulk electroplating, which comprises mixing the divided material with metallic powder particles of high melting point and tensile strength different than the divided material until a substantially uniform mixture is obtained, with the metallic powder particles in electrically conducting contact with one another and with interestices being formed between the particles, forming the article to selected size and shape, filling the interstices with a plating electrolyte for depositing a metal of high melting point and tensile strength which is capable of forming an integrated bond with the metallic powder, and plating for a period of time sufficient to deposit the electrolytic metal from the plating solution upon the powder to unite the particles thereof and to form a rigid porous structure with interstices of reduced cross section.

2. The process of claim 1, wherein the divided material is non-conducting.

3. The process of claim 1, wherein the bulk mixture is compacted before internal electroplating to reduce the size of the interstices.

4. The process of claim 1, wherein the bulk mixture is compressed during internal electroplating to reduce the size of the interstices.

5. A rigid porous article of selected size and shape comprising a divided material of high fusion point, tensile strength and hardness in substantially uniform admixture with metal powder particles of high melting point and tensile strength different from the divided material, said metal powder particles being in electrically conducting contact with one another, the said metal powder particles being united together by an integrated bond of electrolytic metal of high melting point and tensile strength with interstices extending through said electrolytic metal.

GERHARD W. AHRENS.

References Cited in the file of this patent

UNITED STATES PATENTS

| Number | Name | Date |
|---|---|---|
| Re. 12,567 | Case | Nov. 27, 1906 |
| 934,412 | Marius | Sept. 14, 1909 |
| 1,732,317 | Thoma | Oct. 22, 1929 |
| 1,866,283 | Zinser | July 5, 1932 |
| 1,986,197 | Harshaw | Jan. 1, 1935 |
| 2,020,117 | Johnston | Nov. 5, 1935 |
| 2,333,567 | Helmore | Nov. 2, 1943 |
| 2,360,798 | Seligman et al. | Oct. 17, 1944 |
| 2,402,834 | Nachtman | June 25, 1946 |
| 2,411,867 | Brenner | Dec. 3, 1946 |
| 2,424,140 | Beecher | July 15, 1947 |
| 2,470,741 | Gordon | May 17, 1949 |

FOREIGN PATENTS

| Number | Country | Date |
|---|---|---|
| 383,261 | Great Britain | Feb. 3, 1931 |
| 346,473 | Great Britain | Apr. 16, 1931 |
| 398,073 | Great Britain | Sept. 7, 1933 |
| 254,628 | Italy | Aug. 16, 1927 |